United States Patent
Beichl et al.

(10) Patent No.: US 6,932,347 B2
(45) Date of Patent: Aug. 23, 2005

(54) DEVICE FOR A NON-HERMETIC SEAL

(75) Inventors: Stefan Beichl, Herrsching (DE); Wilhelm Graebeldinger, Munich (DE); Alexander Rauschmeier, Munich (DE)

(73) Assignee: MTU Aero Engines, GmbH, Munich (DE)

( * ) Notice: Subject to any disclaimer, the term of this patent is extended or adjusted under 35 U.S.C. 154(b) by 0 days.

(21) Appl. No.: 10/476,925

(22) PCT Filed: Apr. 16, 2002

(86) PCT No.: PCT/DE02/01402

§ 371 (c)(1),
(2), (4) Date: May 17, 2004

(87) PCT Pub. No.: WO02/090720

PCT Pub. Date: Nov. 14, 2002

(65) Prior Publication Data

US 2004/0188943 A1 Sep. 30, 2004

(30) Foreign Application Priority Data

May 10, 2001 (DE) .......................... 101 22 732

(51) Int. Cl.[7] ............................... F16J 15/44
(52) U.S. Cl. ........................ 277/355; 277/409
(58) Field of Search .................. 277/355, 409

(56) References Cited

U.S. PATENT DOCUMENTS

| 4,919,439 A | 4/1990 | Williams |
| 5,114,159 A | 5/1992 | Baird et al. |
| 5,351,971 A | 10/1994 | Short |
| 5,715,596 A | 2/1998 | Bintz |
| 5,884,918 A | 3/1999 | Basu et al. |
| 6,168,162 B1 | 1/2001 | Reluzco et al. |
| 6,173,962 B1 * | 1/2001 | Morrison et al. ........... 277/355 |

FOREIGN PATENT DOCUMENTS

| DE | 19628559 | 1/1998 |
| DE | 19720649 | 11/1998 |
| DE | 19803502 | 8/1999 |
| EP | 0778431 | 6/1997 |
| WO | WO 01/13013 A1 | 2/2001 |

* cited by examiner

*Primary Examiner*—Enoch Peavey
(74) *Attorney, Agent, or Firm*—Crowell & Moring LLP

(57) ABSTRACT

An arrangement for a non-hermetic seal between a stator and a rotor of a turbomachine in the root region of guide blades belonging to the stator. The arrangement includes a brush sealing ring which is mounted on the guide blades via a spoke centering means and whose bristles together with a rotating sealing surface form a fluid barrier which is permeable in a defined manner. On the sealing side of lower pressure, a supporting ring for the bristles is arranged at a slight distance from the rotating sealing surface, and this supporting ring is integrally connected to the guide blade roots and can be segmented by parting seams. The spoke centering means is permeable to pressure, as a result of which the brush sealing ring is pressure-relieved axially, with the exception of the bristle area between the sealing surface and supporting ring.

13 Claims, 3 Drawing Sheets

DEVICE FOR A NON-HERMETIC SEAL

This application claims the priority of International Application No. PCT/DE02/01402, filed Apr. 16, 2002, and German Patent Document No. 101 22 732.9, filed May 10, 2001, the disclosures of which are expressly incorporated by reference herein.

BACKGROUND AND SUMMARY OF THE INVENTION

The invention relates to an arrangement for a non-hermetic seal between a stator and a rotor of a turbomachine.

The term "turbomachines" refers to power-absorbing and power-generating, bladed fluid-flow machines with stator and rotor, such as compressors, pumps and turbines. The invention is directed in particular toward gas turbines in an at least partly axial type of construction for mobile and stationary applications; however, it may also be of interest for steam turbines for example. In practical terms, this involves the sealing region between guide blades and rotor radially inside the actual flow passage. In gas turbine technology, this region is frequently referred to as Inner Air Seal (IAS).

German Patent Document No. DE 196 28 559 A1 describes an arrangement of the generic type for the inner air seal, comprising a brush sealing ring which belongs to the stator, is mounted on the guide blade roots by a spoke centering means and forms together with a cylindrical rotor surface a fluid barrier which is permeable in a defined manner. The principle of the spoke centering results in advantages where marked relative dimensional changes occur between coaxially arranged, connected components due to thermal effects. Since the thermal loading and the heat capacity of adjacent components can be very different, one component, for example, expands earlier, quicker or to a greater extent than another, adjoining component. A spoke centering means comprises at least three support points uniformly distributed over the component periphery and having in each case radial relative mobility. In this case, it is assumed that the components expand and contract uniformly, that is to say dimensional changes take place essentially without changes in shape. In many applications, this is at least approximately the case, support clearances and elasticity compensating for small deviations. The support points with a translatory degree of freedom may be designed, for example, as a combination of sliding block/groove or pin/bush. Components connected by spoke centering are rotationally secured relative to one another and remain concentric during relative dimensional changes (circumference, diameter). Relative axial fixing can in this case likewise be realized.

In the embodiment according to German Patent Document No. DE 196 28 559 A1, there is, for example, a contact element (9) in the form of a rim or bead on the side of lower operating pressure, against which contact element (9) the brush sealing ring (items 1, 2) is pressed and which also performs a sealing function. The contact element (9) seals off an end face of the brush sealing ring at the radially outer margin, so that the operating pressure difference is effective on a large part of the end face of the brush sealing ring. The area effective in this case extends radially from the rotating sealing surface on the inner part (3) up to the contact element (9). The product of pressure difference and effective area may lead to a considerable axial force on the brush sealing ring and ultimately the contact element. In combination with the radial relative movements, which occur cyclically, between the brush sealing ring (item 1) and the contact element (9), this results in high friction and wear (fretting, etc.). In the inner air seal, the situation is generally such that the guide blades suspended on the casing radially on the outside, when hot gas is admitted, "grow" radially inward, i.e., toward the brush sealing ring, and "retract" again radially outward during cooling. This takes place during every thermal loading and load-relief. Apart from friction and wear, the "free" centering may also be impaired, so that the brush sealing ring is possibly deformed, and thus the sealing effect is changed.

Against this background, the object of the invention is to provide an arrangement for a non-hermetic seal between a ring-shaped guide blade cascade and a rotor of a turbomachine which is at least partly of an axial type of construction, which arrangement, with applications of the principle of the spoke-centered brush seal, results in marked improvements by a reduction in friction and wear, by centering free of constraining force, and by a reduction in the secondary leakage in the region of the axial contact surface of the brush sealing ring.

As a sealing contact element for the bristles on the side of lower operating pressure, a supporting ring is arranged in the radial vicinity of the rotating sealing surface, this supporting ring being integrally connected to the guide blade roots and therefore no longer being a component of the brush sealing ring. In combination with a design of the spoke centering means permeable to pressure, the arrangement is pressure-relieved axially to the greatest possible extent and is therefore free of force, since the operating pressure difference is only effective in the region of the small, annular bristle area between rotor and supporting ring. Since the bristle wear to be expected on the supporting ring is low and is probably more likely to be less than the wear on the rotating sealing surface, the last-mentioned type of wear should remain the criterion for an exchange of the brush sealing ring. It is assumed that, over and above the exchange of the brush sealing ring, relevant maintenance measures will not be necessary either on the rotor or on the guide blade roots, including supporting ring. Depending on whether the guide blades of a ring are all integrally connected or are arranged in segments or as individual parts, the supporting ring will also be designed in one piece or so as to be interrupted by parting seams, that is to say, segmented. Individual guide blades or segments of a small number of blades may twist slightly elastically about an—imaginary—radial axis during operation, so that the supporting ring segments on the guide blade roots no longer form an optimally plane contact surface but a contact surface which is slightly stepped at the parting seams. This will be elastically compensated for by the bristles without impairing the sealing effect. It may be noted that, in arrangements according to the prior art (see, inter alia, German Patent Document No. DE 196 28 559 A1), undesirable leakage flows (secondary leakage) of a relevant order of magnitude may occur between twisted contact segments and the rigid brush carrier.

BRIEF DESCRIPTION OF THE DRAWINGS

The invention is explained in more detail below with reference to the drawings, in which, in a simplified representation not to scale.

DETAILED DESCRIPTION OF THE DRAWINGS

Figure 1:
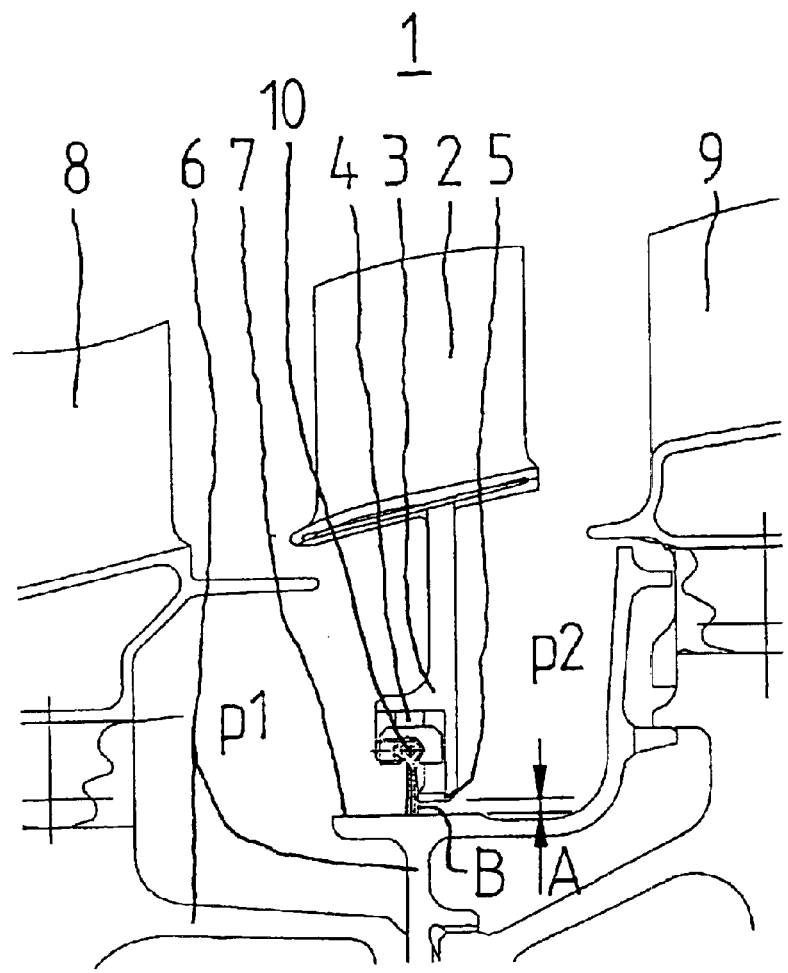
FIG. 1 shows a partial longitudinal section through a gas turbine in the region of an inner air seal.

FIG. 1 shows an arrangement 1 according to the invention in the region of an inner air seal of a gas turbine powerplant. A guide blade 2 can be seen, the suspension of which on the stator, i.e., on the powerplant casing, is not shown, since it is to be designed in a known manner. Moving blades 8 and 9, which are components of a rotor 6, can be seen on the left and right, i.e., upstream and downstream of the guide blade 2. Also belonging to the rotor 6 is a cylindrical sealing surface 7 rotating with it. The root 3 of the guide blade 2 extends radially inward, here downward, right into the actual sealing region at the rotor. All the guide blades 2 together, including their roots 3, form a ring concentric to the rotor and having an essentially radial blade orientation. In smaller gas turbines, the guide blades are often integrally connected, e.g., in the form of a cast or welded construction; in larger machines, it is conventional practice to integrally combine a plurality of blades to form a segment, a plurality of such segments then forming a guide blade ring. There are parting seams between the segments, and these parting seams, as and when required, are bridged with suitable sealing elements. In the extreme case, each individual guide blade forms a separate component, a factor which can facilitate assembly.

The present invention can in principle be applied in the case of all these variants. As a static sealing element, a brush sealing ring 10 is suspended on the guide blade roots 3 via a spoke centering means 4. The arrangement 1 separates a space of higher operating pressure p1 from a space of lower operating pressure p2. Arranged on the side of lower pressure at a slight radial distance A from the sealing surface 7 is a supporting ring 5 which is integrally connected to the guide blade roots 3 and is, if need be, segmented and is intended for the bristles of the brush sealing ring 10. Since the spoke centering means 4 is designed to be permeable to pressure, the higher operating pressure p1 also acts on the right-hand end face of the brush sealing ring up to the point where the supporting ring 5 comes into contact with the bristles. Only the very small, annular bristle area B between sealing surface 7 and supporting ring 5 is loaded by the pressure difference p1−p2, so that there is only a very small resulting axial force on the bristle ends and the supporting ring 5. The spoke centering means 4 is therefore pressure-relieved axially, i.e., is largely subjected to low friction and low wear.

Figure 2:
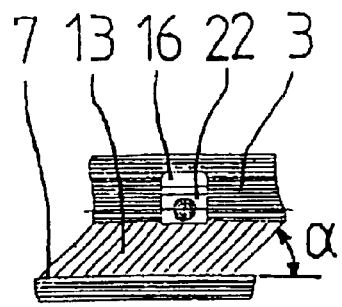
FIG. 2 shows an axial partial view of the sealing elements according to FIG. 1.

For better understanding, FIG. 2 shows an axial partial view of the sealing elements. The rotating sealing surface 7, the bristles 13, which are set an angle α to surface 7 so as to conform to the direction of rotation, and a sliding-block-like guide element 22 which is mounted in a radially displaceable manner in a groove 16 of the guide blade root 3, can be seen. It would also be conceivable to arrange the groove on the brush sealing ring and the sliding block on the guide blade root.

Figures 3, 4:
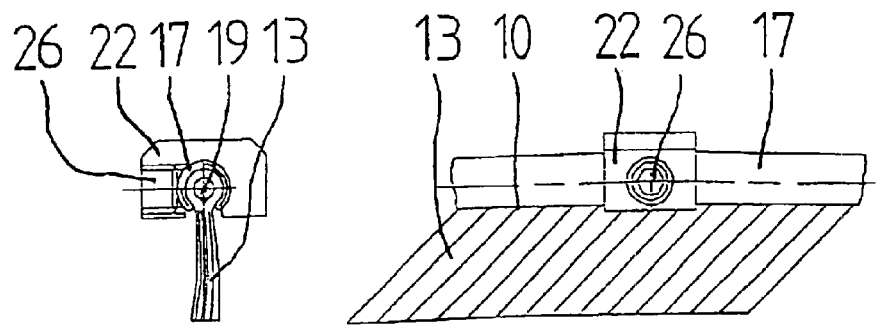
FIG. 3 shows a cross section through a brush sealing ring with guide element.
FIG. 4 shows an axial partial view through the brush sealing ring according to FIG. 3.

FIG. 3, on a larger scale, shows an axial section through the brush sealing ring 10 in the region of the guide element 22. The brush sealing ring here is a frictional variant in which the bristles 13 are directed around a core 19 and fixed by means of a C-shaped clamping ring 17. Both ends of each bristle therefore lie in the sealing region at the rotor. As part of the spoke centering means, the guide element 22 is fixed on the clamping ring 17 in a frictional and adjustable manner by a clamping screw 26.

FIG. 4 shows the associated axial view.

Figures 5, 6:
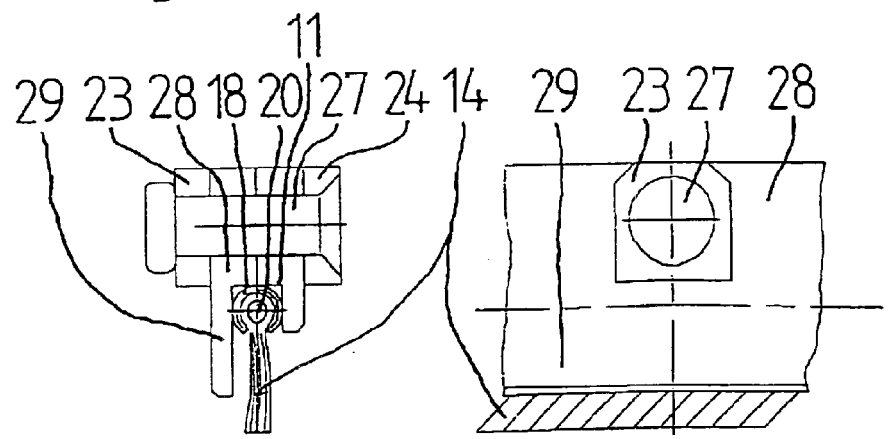
FIG. 5 shows a cross section through a brush sealing ring with stiffening ring and guide elements.
FIG. 6 shows an axial partial view of the brush sealing ring according to FIG. 5.

FIG. 5 shows a brush sealing ring 11 whose brush element is stabilized by a two-piece stiffening ring 28. Such a design is suitable for geometries of larger diameter, in which the unit of clamping ring 18, core 20 and bristles 14 would no longer be sufficiently dimensionally stable on its own. The stiffening ring 28 is directed around the outer circumference of the clamping ring 18 and also secures the latter in a positive-locking manner against deflections in both axial directions. On the side of higher operating pressure, an integral cover ring 29 is directed radially relatively far inward and can protect the bristles 14 in particular against rotation-induced vortex flows. The guide elements 23, 24 for the spoke centering means are fastened here by a rivet 27, which also holds together the parts of the stiffening ring 28. In a corresponding construction, the guide elements 23, 24 can be designed to be rotatable about the rivet axis, a factor which can benefit the ease of motion of the spoke centering means. It is also possible to select the axial extent of the stiffening ring only to be as large as that of the clamping ring, in which case guide elements drawn radially inward could take over the fixing of the brush element. This would correspond more to a lightweight type of construction. Depending on the local flow conditions, a cover ring can often be dispensed with. A further embodiment could have such an appearance that, on one side, a shoulder on the stiffening ring serves as an axial stop for the brush element, whereas guide elements drawn radially inward perform this function on the other side.

FIG. 6 shows the axial view associated with FIG. 5.

Figures 7, 8:
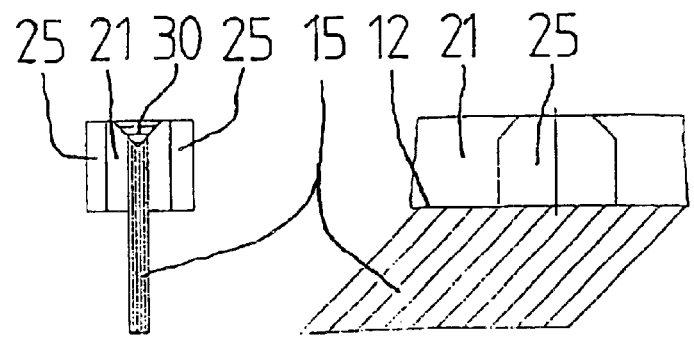
FIG. 7 shows a cross section through a brush sealing ring in welded construction with guide elements.
FIG. 8 shows an axial partial view of the brush sealing ring according to FIG. 7.

FIG. 7 shows a brush sealing ring 12 whose bristles 15 are not clamped frictionally—or not exclusively frictionally—but are cohesively integrated in a retaining ring by a weld 30. A comparable fastening could also be achieved by brazing or adhesive bonding, with, if need be, reduced temperature resistance. Here, the guide elements 25 on both sides are worked from the retaining ring 21 by stock removal, e.g., by milling or ECM machining.

FIG. 8 again shows the associated, axial view.

Figure 9:
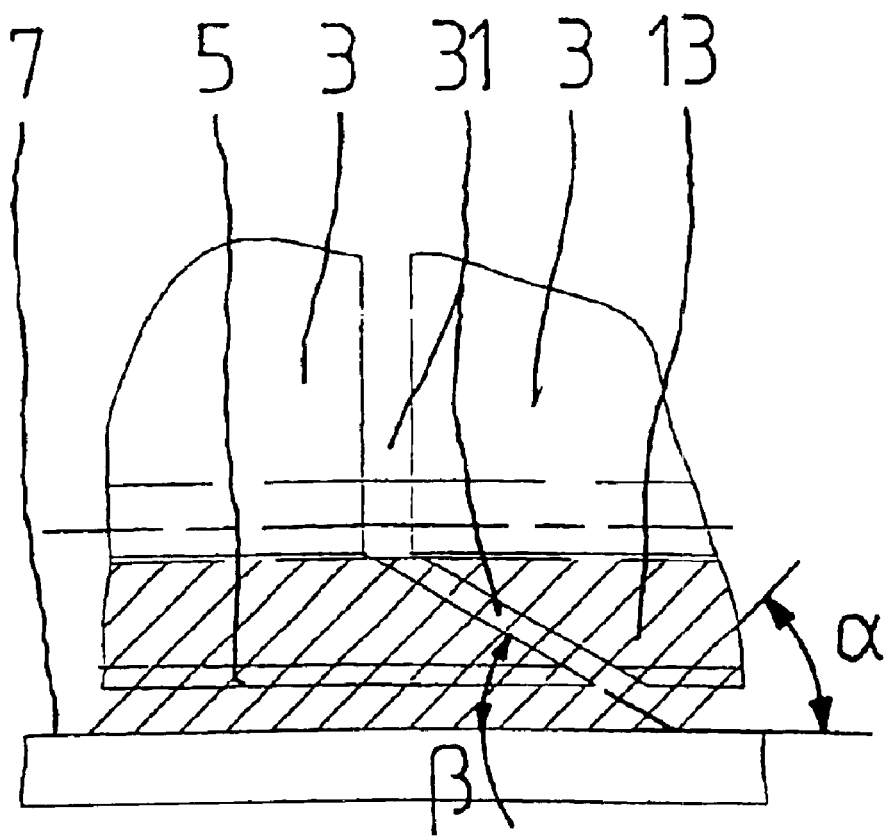
FIG. 9 shows an axial partial view of the sealing elements according to FIG. 1 in the region of a parting seam.

Finally, FIG. 9 shows embodiments having parting seams between guide blade roots, i.e., versions having segmented guide blades or guide blades arranged as individual parts. Two adjacent guide blade roots 3 having a parting seam 31 lying in between can be seen, the parting seam 31 also interrupting the supporting ring 5 locally. The bristles 13 are set at an angle α to the rotating sealing surface 7—to be more precise to the local tangent of the latter. In order to avoid catching or jamming of the bristles 13 in the parting seam 31 during movements relative to the latter, the parting seam, which otherwise runs radially, is directed at an angle β in the bristle region, the angle β preferably crossing the bristle direction a at right angles. If this leads to problems with regard to the guide blade fitting, the parting seam may also be angled to a less pronounced degree or may only run radially.

It may also be noted that the arrangement of the bristles in the brush sealing ring may not only be predominantly radial but may also be axial with a radial angled configuration of the free ends (hook-type brush seal).

What is claimed is:

1. An arrangement for a non-hermetic seal between a stator and a rotor of a turbomachine in a root region of axial-flow guide blades belonging to the stator and arranged concentrically to the rotor as a ring-shaped cascade, comprising a brush sealing ring, a guide blade root, and a spoke centering means wherein the spoke centering means includes at least three support points each having radial relative mobility and wherein the brush sealing ring is mounted on the guide blade root by the spoke centering means and whose bristles together with a rotating, cylindrical sealing surface form a fluid barrier which is permeable wherein, on a sealing side of lower operating pressure, a supporting ring for an axial, sealing support of the bristles is arranged at a slight radial distance from the rotating sealing surface and is integrally connected to the guide blade root and wherein the spoke centering means is permeable to pressure, as a result of which a same, higher operating pressure is applied to the brush sealing ring on both end faces thereof to axially pressure-relieve the brush sealing ring, with an exception of a bristle area extending radially from the rotating sealing surface up to the supporting ring.

2. The arrangement as claimed in claim 1, wherein the brush sealing ring is designed with frictional bristle fixing between a C-shaped clamping ring and a core while winding around the core or with cohesive bristle fixing in a retaining ring by welding, brazing or adhesive bonding, wherein an exposed, flexible region of the bristles has a setting angle ($\alpha$) which depends on an angle of rotation and has a radial and a tangential component relative to the rotating sealing surface.

3. The arrangement as claimed in claim 1, wherein the support points include sliding-block-like guide elements integrally connected to the brush sealing ring and movably mounted in radial grooves on the guide blade root.

4. The arrangement as claimed in claim 3, wherein the brush sealing ring is designed with frictional bristle fixing between a C-shaped clamping ring and a core while winding around the core and wherein a one-piece or multi-piece stiffening ring holding the clamping ring is arranged around an outer circumference of the clamping ring, and wherein the stiffening ring, on a sealing side axially opposite the supporting ring, has an integral cover ring extending radially inward into an exposed region of the bristles, the clamping ring being fixed axially in a positive-locking manner by the stiffening ring and/or by the sliding-block-like guide elements of the spoke centering means.

5. The arrangement as claimed in claim 3, wherein the sliding-block-like guide elements are integrally connected to the brush sealing ring by friction using a clamping screw.

6. The arrangement as claimed in claim 3, wherein the sliding-block-like guide elements are integrally connected to the brush sealing ring by a rivet.

7. The arrangement as claimed in claim 3, wherein the sliding-block-like guide elements are integrally connected to the brush sealing ring by shaping the sliding-block-like guide elements on the brush sealing ring by stock-removal production.

8. The arrangement as claimed in claim 1, wherein the supporting ring is segmented by parting seams and wherein the parting seams, relative to the rotating sealing surface, have a setting angle ($\beta$) having a radial component and a component tangentially opposed in relation to the bristles arranged in a respective parting seam region, so that the bristles and parting seams cross one another at a right angle in an axial direction of view.

9. A turbomachine, comprising:

a stator having a guide blade with a guide blade root;

a rotor having a sealing surface;

a brush sealing ring;

a pressure permeable spoke centering mechanism that includes at least three support points each having radial relative mobility;

wherein the brush sealing ring is mounted on the guide blade root by the pressure permeable spoke centering mechanism and wherein bristles of the brush sealing ring and the sealing surface form a fluid barrier; and a supporting ring integrally connected to the guide blade root on a low pressure side of the brush sealing ring, wherein an end of the supporting ring is arranged at a distance from the sealing surface;

wherein the brush sealing ring is pressure-relieved axially by the permeable spoke centering mechanism except for a bristle area extending between the sealing surface and the end of the supporting ring.

10. The turbomachine as claimed in claim 9, wherein the three support points include a sliding-block-like guide element which is radially displaceable in a groove of the guide blade root.

11. The turbomachine as claimed in claim 9 further comprising a stiffening ring disposed on the brush sealing ring and including a cover ring on a high pressure side of the brush sealing ring wherein the cover ring extends radially toward the sealing surface.

12. A method for pressure-relieving a brush sealing ring in a turbomachine, wherein the turbomachine includes a brush sealing ring, a stator having a guide blade and a guide blade root, and a pressure permeable spoke centering mechanism that includes at least three support points each having radial relative mobility, wherein the brush sealing ring is mounted on the guide blade root of the stator by the pressure permeable spoke centering mechanism, and further including a supporting ring integrally connected to the guide blade root on a low pressure side of the brush sealing ring such that an end of the supporting ring is arranged at a distance from a sealing surface of a rotor, comprising the steps of:

axially pressure-relieving the brush sealing ring by the permeable spoke centering mechanism except for a bristle area of the brush sealing ring extending between the sealing surface and the end of the supporting ring.

13. The method of claim 12 further comprising the step of radially displacing the spoke centering mechanism in a groove of the guide blade root.

* * * * *